United States Patent

Uhde et al.

Patent Number: 5,414,579
Date of Patent: May 9, 1995

[54] HEAD CYLINDER FOR A RECORDER

[75] Inventors: Dietmar Uhde, Königsfeld; Rüdiger Lehmann, St. Georgen; Günter Gleim, Villingen-Schwenningen; Peter Hoch, Triberg, all of Germany; Hartmut Schandl, Vienna, Austria

[73] Assignee: Deutsche Thomson-Brandt GmbH, Germany

[21] Appl. No.: 159,700

[22] Filed: Nov. 26, 1993

[30] Foreign Application Priority Data

Jun. 6, 1991 [DE] Germany .................. 41 18 535.8
May 29, 1992 [WO] WIPO ............... PCT/EP92/01192

[51] Int. Cl.⁶ ............................................. G11B 15/46
[52] U.S. Cl. ................................... 360/107; 360/71; 360/108
[58] Field of Search ........................... 360/107–108, 360/130.24, 130.34, 71

[56] References Cited

U.S. PATENT DOCUMENTS

| | | | |
|---|---|---|---|
| 3,402,257 | 9/1968 | De Lange | 178/6.6 |
| 3,569,804 | 3/1971 | Studer | 318/138 |
| 3,600,508 | 8/1971 | Dann et al. | 178/6.6 |
| 4,319,294 | 3/1982 | Repp | 360/107 |
| 4,672,489 | 6/1987 | Wada et al. | 360/107 X |
| 4,958,248 | 9/1990 | Trcka | 360/107 |
| 5,198,738 | 3/1993 | Blaser et al. | 318/652 |

FOREIGN PATENT DOCUMENTS

| | | | |
|---|---|---|---|
| 0233540 | 8/1987 | European Pat. Off. | H02K 29/10 |
| 3403150 | 7/1985 | Germany | H04N 5/782 |
| 1546386 | 5/1979 | United Kingdom | H02K 29/10 |

*Primary Examiner*—John H. Wolff
*Attorney, Agent, or Firm*—Joseph S. Tripoli; Joseph J. Laks; Sammy S. Henig

[57] ABSTRACT

A drum for a rotatable cylinder head includes an opaque disc-shaped member having a plurality of opaque fins affixed thereto and arranged substantially normal to the disc-shaped member. A first plurality of the fins has a first width and a second plurality of the fins has a second width broader than the first width. Every fin has a distal end remote from the disc-shaped member, and an opaque circumferential ring is affixed to the distal end of each fin. The disc-shaped member, the fins and the circumferential ring form a plurality of apertures about the drum.

3 Claims, 1 Drawing Sheet

HEAD CYLINDER FOR A RECORDER

This is a continuation of PCT application PCT/EP92/01192, filed May 29, 1992 by Dietmar Uhde, Rudiger Mann, Gunter Gleim and Peter Hoch and titled "Head Drum For A Recorder".

This invention is directed to a head cylinder of the type described in DE-OS 36 04 238. Such a head cylinder contains a marker ring in the form of a cup-shaped piece of transparent material, e.g. Plexiglas, having broad and narrow opaque stripes printed around its circumference. By scanning these opaque stripes opto-electronically, short pulses of a relatively high frequency and longer pulses of a lower frequency are generated. Such pulses are used in the regulation of the rotational speed of the head cylinder, in the generation of head change-over pulses and in the electronic commutation of a brush-less direct current motor.

The opaque marking must be printed onto the head cylinder in an additional working step. Also a so-called "noise effect" occurs because dust can accumulate on the transparent areas between the opaque markings. This build-up of dust influences the light transmission during scanning and creates noise in the pulse signal generated and can lead to malfunctions.

It is an object of the invention to simplify the application of the opaque markings, to reduce the cost of the marker ring and to eliminate or reduce the noise effect.

With the invention the opaque marker stripes are replaced opaque fins of differing widths which project from an edge of a disc-like member. The ends of the fins which project away from the edge of the disc are interconnected by an opaque circumferential ring whereby material-free apertures are formed between the fins, the disc and the ring. The sections of transparent material used in the prior art ring are thus replaced with such aperatures. Accordingly, because there is no material in these areas, the accumulation of dust is avoided and the above-mentioned noise effect is eliminated. The printed black stripes of the prior art device ring are replaced by the fins of opaque material. Accordingly, the working step of printing the black stripes is eliminated. Also, because the entire cup-shaped member is made from opaque material and because the light transmission areas are apertures the characteristics of member can not change with age and detrimentally affect the light transmission contrast ratio of the fins and apertures.

The ring which connects the free ends of the narrow and broad fins has a special significance. If the ring were not used the fins, particularly the narrow fins, could be bent, or otherwise distorted, by temperature or aging effects. The pulses derived from such fins could cause temporal errors to occur in the positions of the pulses. There is also the danger that individual fins could be broken off because of their narrowness. The use of the ring to interconnect the free ends of the fins assures good stability even for the narrow fins, and circumferential distortion of the fins is thus avoided. Also, without the ring it would be possible for the fins to deflect due to centrifugal force. This could cause the fins to flutter and cause the pulse trains to be unstable or inaccurate. The inventive marker ring thus exhibits the aforementioned advantages and fulfills all requirements, in particular those regarding stability and the accuracy of the pulse trains generated.

The invention is described with reference to drawings in which.

Figure 1:
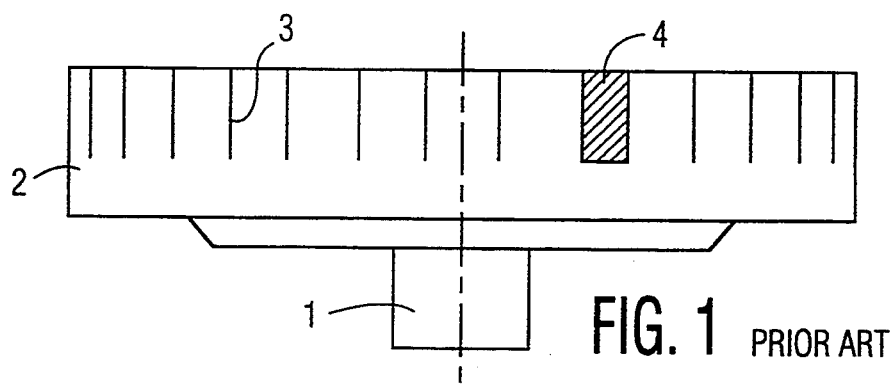
FIG. 1 shows a prior art marker ring on a head cylinder.

In FIG. 1, the cup-shaped rotating part 2, is made of transparent material, such as Plexiglas, and is attached to a rotating part 1 of a head cylinder, not shown, by a hub. Opaque markings in the form of narrow black lines 3 and broader black lines 4 are printed on the outer circumference of part 2. Scanning these markings optoelectronically generates short pulses of relatively high frequency from the narrow lines 3 and longer pulses with lower frequency from the broader lines 4.

Figure 2:
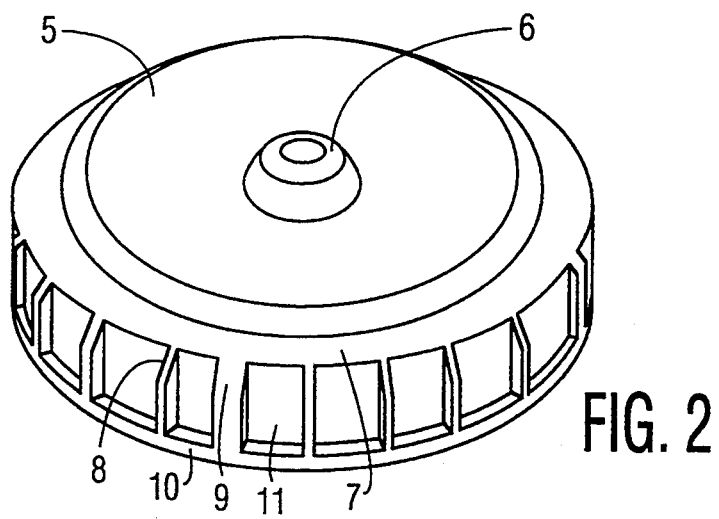
FIG. 2 is a perspective view of a preferred embodiment.

FIG. 2 shows a cup-shaped member in accordance with the invention and the function of which corresponds to that of part 2 in FIG. 1. However, this member is fabricated from an opaque material, such as black plastic. A disc-shaped part 5 is attached by a hub 6 to the rotatable shaft of the head cylinder, not shown. The outer circumferential edge of disc-shaped part 5 is a continuous, opaque annular surface 7. A multiplicity of fins 8 having a relatively narrow width, of 0.5 mm e.g. and several broader fins 9 having a broader width, of about 3 mm e.g. The distal ends of the fins are affixed to a circumferential ring 10. The disc-shaped part 5, the annular surface 7, the narrow fins 8, the broad fins 9 and the circumferential ring 10 form a large number of apertures 11 through which the light beam of a photo-electric barrier can pass unhindered.

The function of the narrow fins 8 corresponds to that of the narrow stripes 3 in FIG. 1. However, the fins are advantageous in that they do not have to be printed; rather, they are formed as parts of a one-piece injection molded plastic part as shown in FIG. 2. The wide fins 9 have the same function as the broad stripes 4 in FIG. 1. The apertures 11 correspond to the transparent sections between the stripes 3 and 4 in FIG. 1. However, the apertures are advantageous in that they contain no material and, therefore, no accumulations of dust can buildup on them. The circumferential ring 10, to which fins 8 and 9 are affixed links the ends of the fins together to guarantee the necessary stability of the fins, particularly for the narrow fins 8.

Figure 3:
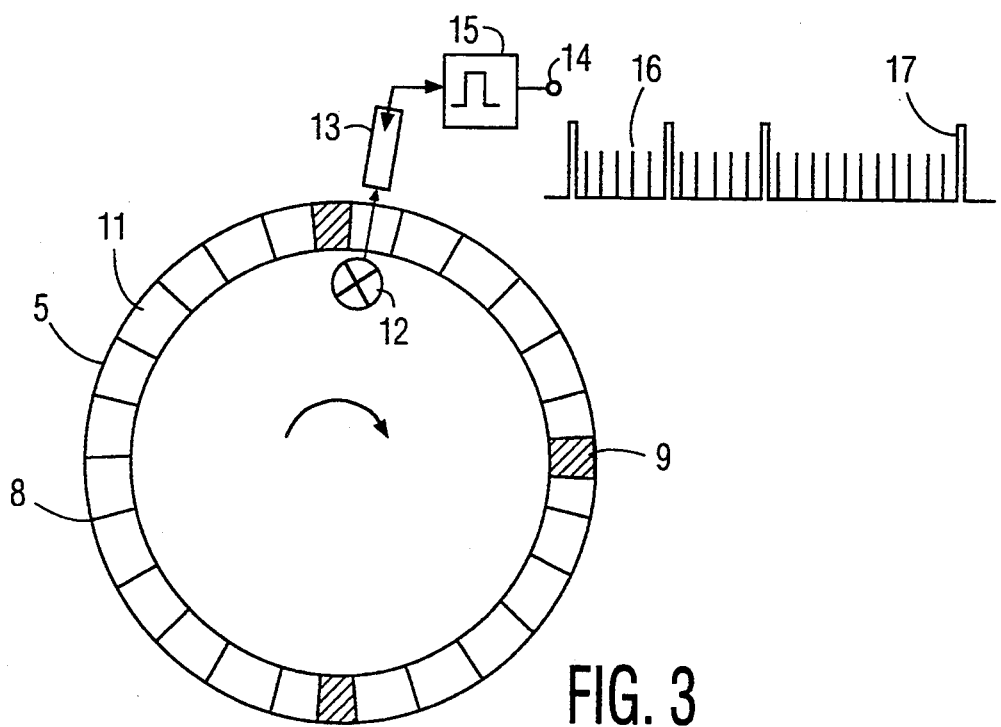
FIG. 3 is a cross-section through the ring shown in FIG. 2.

FIG. 3 shows, in principle, the method of operation of part 5 in FIG. 2, which is akin to a cross-section taken at the level of the apertures 11. Three wide fins 9 are provided at the angles of rotation 0°, 90° and 180°, that is two fins are spaced at 90° intervals from a central fin. This asymmetrical arrangement is advantageous because the actual position of part 5 and, thus also of the rotating part of the head cylinder to which it is attached, can be detected. A symmetrical arrangement of fins will not enable the determination of position irrespective of the number of broad fins. The scanning of the fins 8 and 9 is performed with a light source 12 and a photo-sensitive element 13. A pulse sequence is generated at the output 14 of a pulse shaper 15 by means of the optoelectronic scanning of the fins 8 and 9. This sequence contains relatively short pulses 16 of a high frequency, triggered by the narrow fins 8 and preferably serves to regulate the rotational speed of the head cylinder. The pulse sequence also contains relatively long pulses 17 at a lower frequency and greater amplitude, which are generated by the broad fins 9 and preferably can serve as a servo regulation function or as a generator of switching pulses for head change-over.

We claim:
1. A drum for a rotatable cylinder head comprising:
an opaque disc-shaped member;
a plurality of opaque fins affixed to said disc-shaped member and substantially normal to said disc-shaped member, a first plurality of said fins having a first width and a second plurality of said fins having a second width broader than said first width, each of said fins having a distal end remote from said disc-shaped member; and
an opaque circumferential ring affixed to said distal ends of each of said fins, said opaque disc-shaped member, said fins and said circumferential ring forming a plurality of apertures about said drum.

2. The drum of claim 1 wherein the fins of said second plurality of fins are asymmetrically spaced about said disc-shaped member.

3. The drum of claim 2 wherein said second plurality of fins includes two fins spaced at 90° intervals from a third central fin.

* * * * *